United States Patent
Joseph et al.

(10) Patent No.: US 7,083,098 B2
(45) Date of Patent: Aug. 1, 2006

(54) MOTION DETECTION IN IMAGING READER

(75) Inventors: Eugene Joseph, Coram, NY (US); Bradley Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 3 days.

(21) Appl. No.: 10/925,177

(22) Filed: Aug. 24, 2004

(65) Prior Publication Data

US 2006/0043185 A1   Mar. 2, 2006

(51) Int. Cl.
  *G06K 7/14* (2006.01)
  *G06K 7/10* (2006.01)
(52) U.S. Cl. ............. 235/454; 235/462.08; 235/462.41
(58) Field of Classification Search ............ 235/462.08, 235/462.09, 462.1, 462.11, 462.41, 462.42, 235/462.45, 462.01, 462.31, 472.01, 470
See application file for complete search history.

(56) References Cited

U.S. PATENT DOCUMENTS

| | | | | |
|---|---|---|---|---|
| 5,155,345 A * | 10/1992 | Ito | ........................ | 235/462.31 |
| 5,489,769 A * | 2/1996 | Kubo | ..................... | 235/462.09 |
| 6,006,990 A * | 12/1999 | Ye et al. | ...................... | 235/454 |
| 6,173,894 B1 * | 1/2001 | Olmstead et al. | ....... | 235/462.01 |
| 6,585,158 B1 * | 7/2003 | Norskog | ................. | 235/462.45 |
| 6,637,658 B1 * | 10/2003 | Barber et al. | ........... | 235/462.45 |
| 6,708,885 B1 * | 3/2004 | Reiffel | .................... | 235/462.41 |
| 2004/0195332 A1 * | 10/2004 | Barber et al. | ........... | 235/462.11 |

FOREIGN PATENT DOCUMENTS

JP  8-235297 A  *  9/1996

* cited by examiner

*Primary Examiner*—Jared J. Fureman
(74) *Attorney, Agent, or Firm*—Kirschstein, et al.

(57) ABSTRACT

A subarray of a CMOS imaging sensor array is addressed to detect when a target symbol is fully within a field of view of an imaging reader to improve reader performance at high swipe speeds.

18 Claims, 3 Drawing Sheets

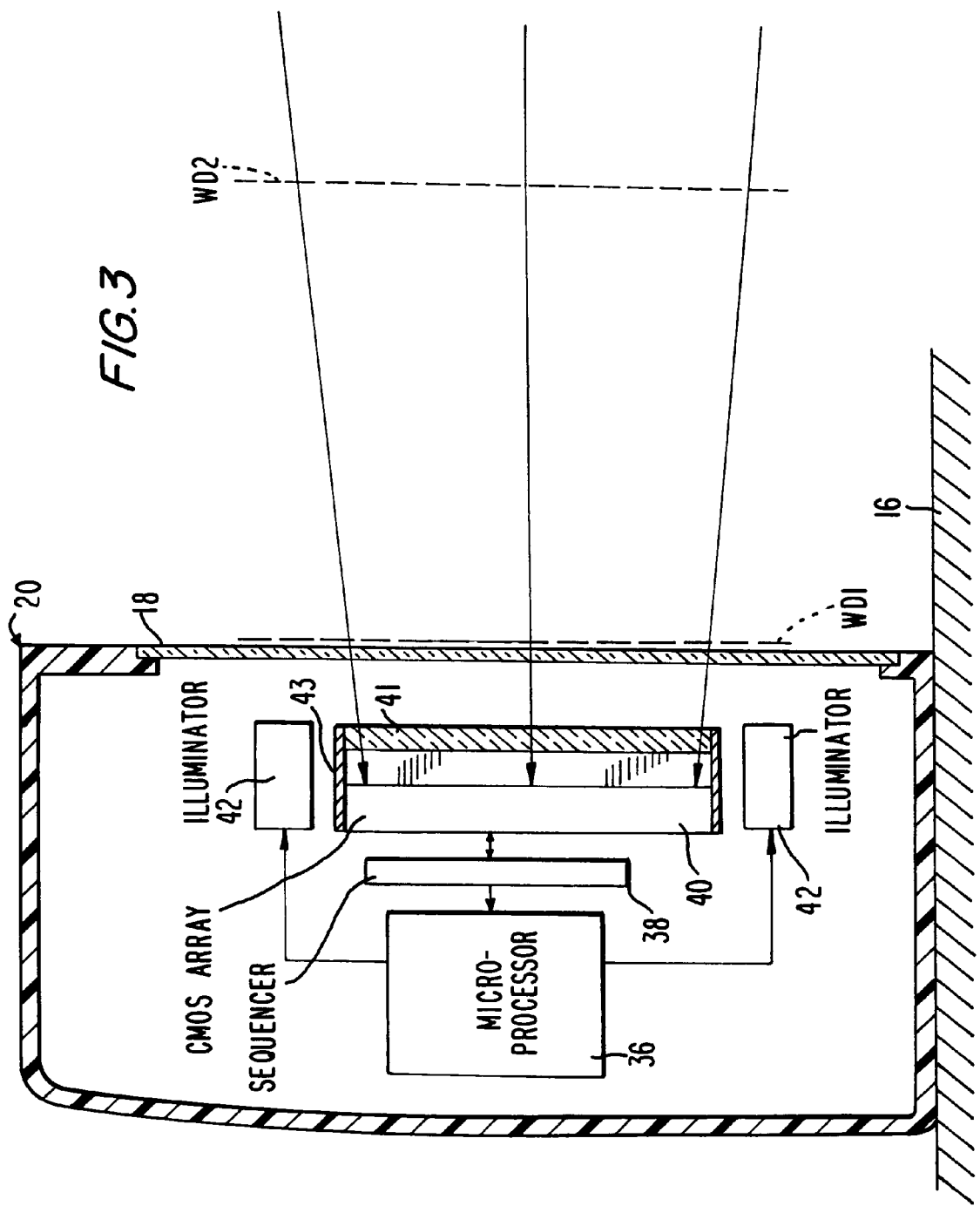

MOTION DETECTION IN IMAGING READER

BACKGROUND OF THE INVENTION

1. Field of the Invention

The present invention generally relates to an electro-optical reader for reading indicia, especially two-dimensional indicia, by image capture and, more particularly, for detecting relative motion between the indicia and the reader prior to reading of the indicia to insure that the indicia is located entirely within a field of view of the reader, thereby improving reader performance, especially when rapid relative motion is performed between the indicia and the reader.

2. Description of the Related Art

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, horizontal window is set flush with, and built into, a horizontal countertop of the workstation. Products to be purchased bear an identifying symbol and are typically slid or swiped across the horizontal window through which a multitude of scan lines is projected in a generally upwards direction. When at least one of the scan lines sweeps over a symbol associated with a product, the symbol is processed and read.

The multitude of scan lines is generated by scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

Instead of, or in addition to, a horizontal slot scanner, it is known to provide vertical slot scanner which is typically a portable reader placed on the countertop such that its window is generally vertical and faces an operator at the workstation. The generally vertical window is oriented perpendicularly to the horizontal window, or is slightly rearwardly inclined. The scan pattern generator within the workstation also projects the multitude of scan lines in a generally outward direction through the vertical window toward the operator. The generator for the vertical window can be the same as or different from the generator for the horizontal window. The operator slides or swipes the products past either window from right to left, or from left to right, in a "swipe" mode. Alternatively, the operator merely presents the symbol on the product to the center of either window in a "presentation" mode. The choice depends on operator preference or on the layout of the workstation.

Each product must be oriented by the operator with the symbol facing away from the operator and directly towards either window. Hence, the operator cannot see exactly where the symbol is during scanning. In typical "blind-aiming" usage, it is not uncommon for the operator to repeatedly swipe or present a single symbol several times before the symbol is successfully read, thereby slowing down transaction processing and reducing productivity.

The blind-aiming of the symbol is made more difficult because the position and orientation of the symbol are variable. The symbol may be located low or high, or right to left, on the product, or anywhere in between. The symbol may be oriented in a "picket fence" orientation in which the elongated parallel bars of the one-dimensional UPC symbol are vertical, or in a "ladder" orientation in which the symbol bars are horizontal, or at any orientation angle in between.

As advantageous as these point-of-transaction workstations are in processing transactions involving products associated with one-dimensional symbols each having a row of bars and spaces spaced apart along one direction, the workstations cannot process two-dimensional symbols, such as Code 49 which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786. Such two-dimensional symbols are generally read by electro-optical readers operative for projecting a laser beam as a raster of scan lines, each line extending in one direction over a respective row, and all the lines being spaced apart along a height of the two-dimensional symbol in a generally perpendicular direction.

Both one- and two-dimensional symbols can also be read by employing solid-state imagers. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

However, the known point-of-transaction workstations do not generate raster scans capable of reading two-dimensional symbols, nor do they utilize solid-state imagers for capturing images of two-dimensional targets, especially two-dimensional symbols required to be electro-optically read. To acquire a target image, a solid-state imager, for example as embodied in a consumer digital camera, must be held in a stationary position relative to the target. Only when a solid-state imager is held in a fixed position relative to a target symbol can an image of the symbol be reliably captured and decoded, with the data encoded in the symbol being sent to a host for processing. In the context of a point-of-transaction workstation where the operator swipes the symbol at various swipe speeds past the window, sometimes once, sometimes several times, and where the operator presents the symbol with an additional component of movement toward and away from a window, and in some cases where the symbols are transported at various speeds on a moving conveyor past a window, and in still other cases where a handheld reader having a window is moved at various speeds relative to the symbol, the image of the symbol is blurred due to the relative motion between the symbol and the imager and, as a result, the image cannot be reliably and successfully decoded and read.

By way of numerical example, commonly available imagers operate at a video or frame rate of 30 frames per second. Thus, the time to read an image out of the imager is about 33 milliseconds. At a swipe speed of 50 inches per second, a symbol travels approximately 1.5 inches in 30 milliseconds. The field of view at the near end of a working range of the reader could be about 2 inches or less in width. Therefore, at swipe speeds greater than 50 inches per second, the symbol can enter and exit the field of view in a time period less than 33 milliseconds, thereby making it impossible to successfully read the symbol. In effect, the symbol may be moved through the field of view so quickly that a conventional imager does not have sufficient time to obtain even one complete image of the symbol.

SUMMARY OF THE INVENTION

OBJECTS OF THE INVENTION

Accordingly, it is a general object of this invention is to advance the state of the art of electro-optical readers that operate by image capture.

Another object of this invention is to reliably capture two-dimensional target images of a symbol moving at swipe speeds greater than can be read by commonly available imagers.

Still another object of the present invention is to capture images of fast-moving targets at workstations or at handheld readers to enhance reader performance.

FEATURES OF THE INVENTION

In keeping with the above objects and others which will become apparent hereinafter, one feature of the present invention resides, briefly stated, in a reader for electro-optically reading indicia, especially two-dimensional symbols. The reader could be embodied as a stationary point-of-transaction workstation having a window, or as a handheld reader having a window. During reading, relative motion is conducted between the symbol and the window. For example, in the case of the workstation, the symbol is swiped past the window and, in the case of the handheld reader, the reader itself is moved relative to the symbol. In the preferred embodiment, the workstation is installed in a retail establishment, such as a supermarket.

In accordance with this invention, a two-dimensional, solid-state imager is mounted in the reader, and includes an array of addressable image sensors operative for capturing light from a two-dimensional target through the window over a field of view during the reading. Preferably, the array is a CMOS array. Selected ones of the addressable image sensors form a subarray operative for capturing light through a section of the window from the target at a region-of-interest (ROI) within the field of view. The ROI is used to detect the target and to judge when the target is fully within the field of view. The ROI contains fewer sensors than the entire array and, hence, the ROI can be read out in a shorter time period as compared to the time period that the active array needs to capture an entire image. Thus, at high swipe speeds, for example, greater than 50 inches per second, the ROI is used to detect the relative motion of the target and to time the capture of the full target image. The array can successfully decode the full target image, because the array is addressed for such image capture only after the ROI, which is free-running, has confirmed that the target is fully within the field of view. The non-ROI area of the imager is not free-running, and is only triggered when needed.

The ROI can be a single region, or a plurality of regions arranged within the field of view. A sequencer is employed for sequentially addressing the regions to enable motion detection by only one of the regions at a time.

The imager is associated with a high-speed strobe illuminator to enable the image of the target to be acquired in a very short period of time, for example, on the order of 500 microseconds, so that the target image is not blurred even if there is relative motion between the imager and the target. The strobe illumination is brighter than ambient illumination, especially close to the window, and assists autodiscrimination as described herein.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a block circuit diagram of various components of the workstation of FIG. 1.

DETAILED DESCRIPTION OF THE PREFERRED EMBODIMENTS

Figure 1:
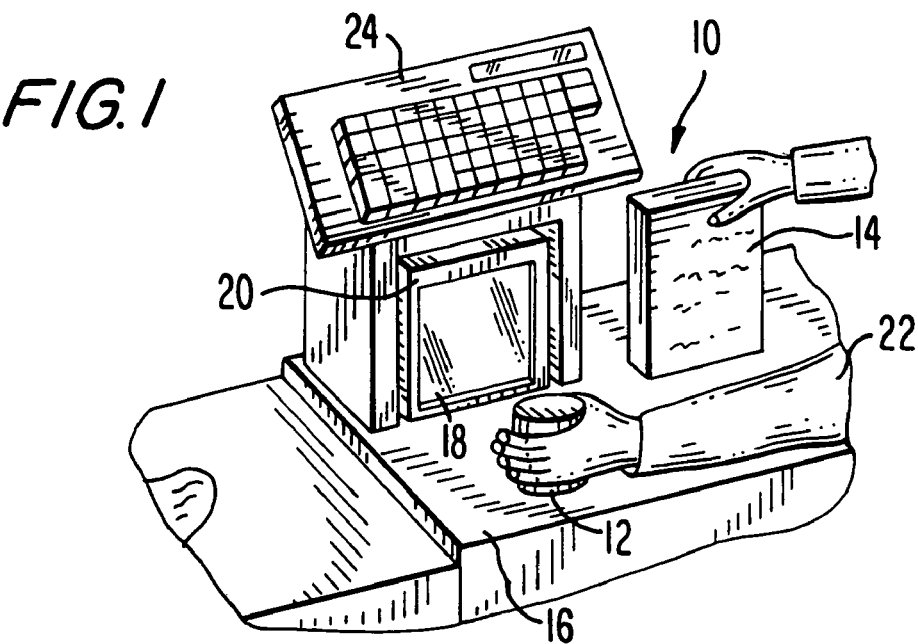
FIG. 1 is a perspective view of a point-of-transaction workstation operative for capturing light from two-dimensional targets in accordance with this invention.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a vertical window 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator.

Figure 2:
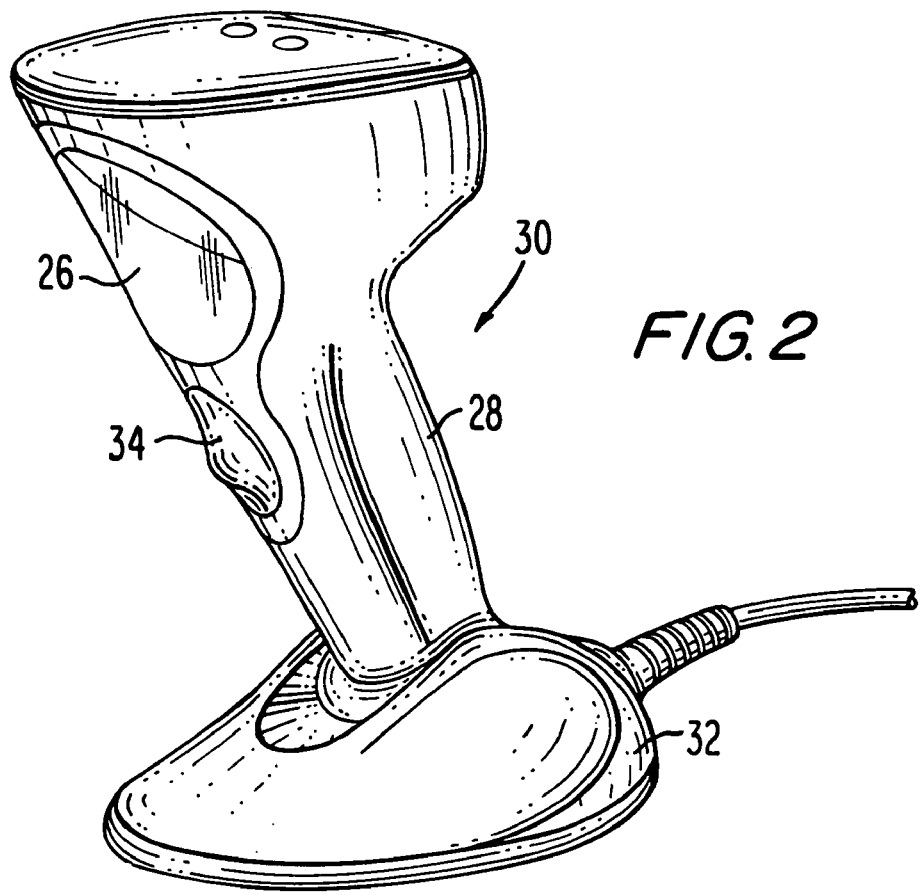
FIG. 2 is a perspective view of an electro-optical reader operative in either a hand-held mode, or a workstation mode, for capturing light from two-dimensional targets in accordance with this invention.

Reference numeral 30 in FIG. 2 generally identifies another reader having a different configuration from that of reader 20. Reader 30 also has a generally vertical window 26 and a gun-shaped housing 28 supported by a base 32 for supporting the reader 30 on a countertop. The reader 30 can thus be used as a stationary workstation in which products are slid or swiped past the vertical window 26, or can be picked up off the countertop and held in the operator's hand and used as a handheld reader in which a trigger 34 is manually depressed to initiate reading of the symbol.

As described so far, the readers 20, 30 are conventional. In accordance with this invention, an imager 40 and a focusing lens 41 are mounted in an enclosure 43 in either reader, such as the reader 20 of FIG. 3. The imager 40 is a solid-state device, preferably a CMOS imager and has an array of addressable image sensors operative for capturing light through the window 18 from the two-dimensional symbol over a field of view and located in a working range of distances between a close-in working distance (WD1) and a far-out working distance (WD2). In a preferred embodiment, WD1 is about two inches from the sensor and generally coincides with the window 18, and WD2 is about eight inches from the window 18. An illuminator 42 is also mounted in the reader and preferably includes a plurality of light sources, e.g., light emitting diodes (LEDs), arranged in an annulus around the imager 40 to uniformly illuminate the target, as further described below.

As shown in FIG. 3, the area imager 40 and the illuminator 42 are operatively connected to a microprocessor 36 operative for controlling the operation of these components. Preferably, the microprocessor is the same as the one used for decoding light scattered from the indicia and for processing the captured target images.

In operation, the microprocessor 36 sends a command signal to the illuminator 42 to pulse the LEDs for a short time period of 500 microseconds or less, and energizes the area imager 40 to collect light from a target only during said time period. A typical CMOS array needs about 33 milliseconds to read the entire target image and operates at a video rate of about 30 frames per second. The CMOS array may have on the order of one million addressable image sensors.

In the presence of relative motion between the imager and the target, especially at high swipe speeds of 50 inches per second or greater, the target enters and exits the field of view before the entire image of the target can be captured. Hence, this invention proposes the selection of a subarray of the addressable image sensors, and addressing the subarray prior to the capture of the entire image by the full array. The subarray contains fewer sensors than the entire array and thus can be read out in a shorter period of time. The subarray captures light through a section of the window from the target at a region-of-interest (ROI) within the field of view. Since the ROI operates in a shorter time period, the ROI can be used to judge when the target is fully within the field of view. Instead of the array operating in a free-running continuous mode, the array can be triggered to operate only when the target is fully within the field of view.

Figure 4:
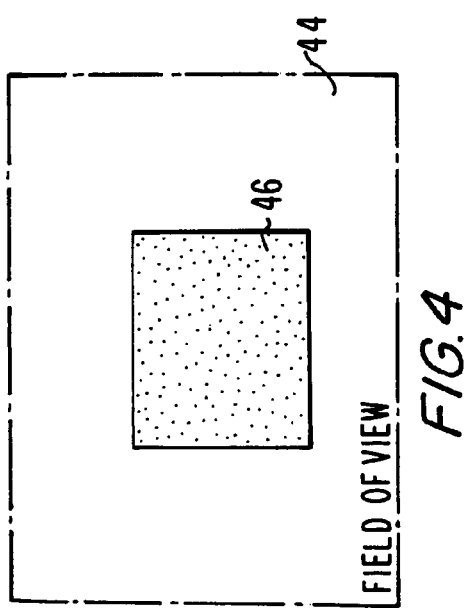

For example, as depicted in FIG. 4, the field of view of the full target image is identified by a rectangular field 44. A subarray of the sensors of the array 40 at a central region of the array is addressed and selected to capture light only at the ROI which, in this embodiment, is a central rectangular region 46 within the field of view. The ROI 46 which contains fewer sensors detects the presence of the target at a higher frame rate and, in turn, the full array is triggered to read the full target image.

Figure 6:
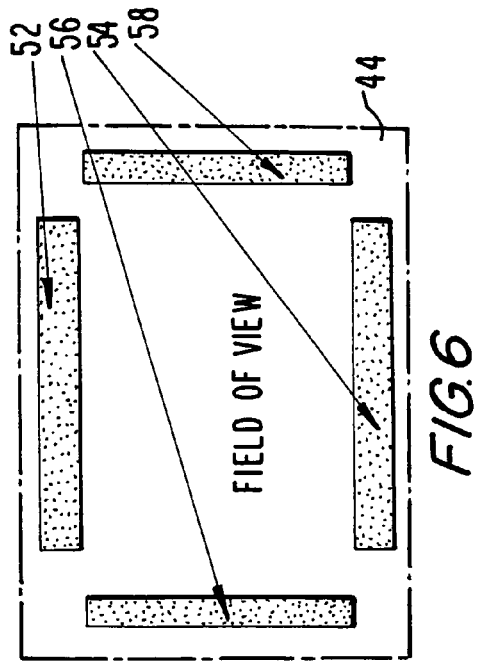
FIGS. 4–7 are different configurations or regions-of-interest in a field of view of an imager for use in accordance with this invention.
Figure 7:
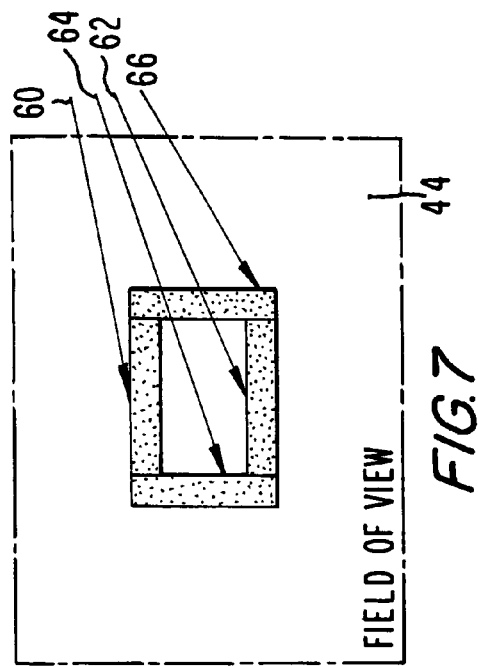
Figure 5:
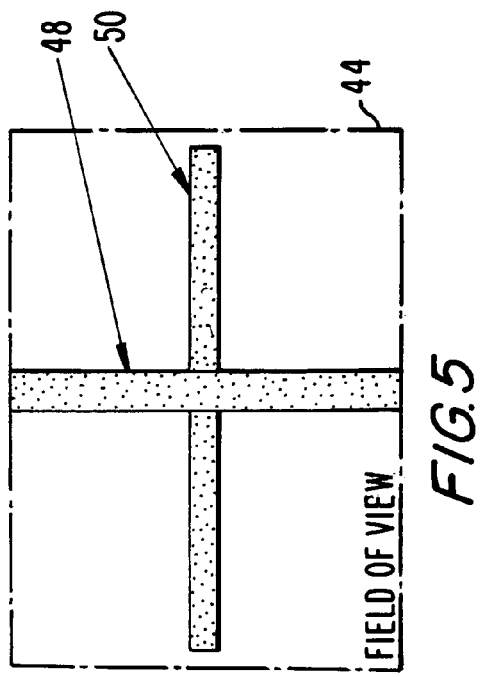

In FIG. 5, the ROI is configured as two narrow rectangular regions 48, 50 intersecting at right angles and resembling a crosshairs pattern. In FIG. 6, the ROI is configured as four narrow rectangular regions 52, 54, 56, 58 at outer peripheral margins of the field of view to frame the same. In FIG. 7, another four narrow rectangular regions 60, 62, 64, 66 are arranged in a rectangular frame at a central region of the field of view.

When there are plural regions as in FIG. 5–7, a sequencer 38, as shown in FIG. 3, is operative to sequentially address the regions. For example, the sequencer 38, which may be combined into the microprocessor 36, addresses first the top region 52, followed by bottom region 54, followed by left region 56, followed by right region 58, in FIG. 6. In this way, the reader will know from which direction the target is approaching the field of view, as well as when the target is fully within the field of view, and also when the target exits the field of view.

In accordance with this invention, the effective frame rate for detection of a target is increased. For swipe speeds of 50 inches per second or greater, the regions are analyzed at a rate on the order of 100 times per second. Given an array that runs at a sensor clock rate of 12 MHz, the ROI contains at most about 120,000 sensors. The number of sensors or the frame rate can be increased if the array runs at faster sensor clock rates.

The strobe illumination projected by the illuminator 42 is preferably set to be much stronger throughout the working range to benefit the task of autodiscrimination. As usually is the case, there are various objects within the field-of-view of the imager. Since the illuminator 42 is generally integrated with the imager, the amount of illumination per area available on an object is inversely proportional to the square of the distance to the object. The distance of the object to the imager is not a factor for the return light collection, as each sensor of the imager is mapped to an area on the object that is directly proportional to the square of this distance, thereby canceling the effect of the same area looking smaller when located further away from the imager.

Therefore, objects in the foreground, which tend to be the ones bearing the indicia to be scanned, appear to be much brighter than those in the background. In other words, their contrasts are much higher. The exposure parameters for the imager is set such that objects within the working range appear to have the proper illumination in the images acquired, while objects in the background would appear almost completely dark. This is only feasible in the case where the strobe illumination is much stronger, for example, ten times or more greater as compared to the ambient light. Ambient light does not provide discrimination since it tends to be rather uniform at the various distances from the imager.

It will be understood that each of the elements described above, or two or more together, also may find a useful application in other types of constructions differing from the types described above. Thus, readers having different configurations can be used.

While the invention has been illustrated and described as motion detection in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
   a) a housing having a window past which relative motion between the window and the indicia is conducted along a direction during reading;
   b) a solid-state imager in the housing and including an array of addressable image sensors for capturing light through the window from the indicia over a field of view during the reading, the array having a subarray of the addressable image sensors for capturing light through a section of the window from the indicia at a region-of-interest (ROI) within the field of view, the ROI including a plurality of regions spaced apart of one another; and c) a sequencer for addressing the sensors in each region, one region at a time, to detect the direction of the relative motion prior to the reading to insure that the indicia is located entirely within the field of view during the reading by the array.

2. The reader of claim 1, wherein each region is a rectangular region.

3. The reader of claim 2, wherein the rectangular regions are arranged at outer peripheral margins of the field of view to frame the field of view.

4. The reader of claim 2, wherein the rectangular regions are arranged to frame a central area of the field of view.

5. The reader of claim 2, wherein the rectangular regions contact each other.

6. The reader of claim 2, wherein the rectangular regions are remote from one another.

7. The reader of claim 2, wherein two of the rectangular regions are spaced apart along a first direction, and wherein another two of the rectangular regions are spaced apart along a second direction perpendicular to the first direction.

8. The reader of claim 1, wherein the housing has a handle for handheld operation.

9. The reader of claim 1, wherein the housing has a base for supporting the housing on a support surface for workstation operation.

10. The reader of claim 1, and an illuminator for illuminating the indicia during the reading with illumination at least ten times greater in intensity as compared to ambient light.

11. A method of electro-optically reading indicia, comprising the steps of:

a) conducting relative motion between the indicia and a window of an electro-optical reader along a direction during reading of the indicia;

b) capturing light through the window from the indicia over a field of view during the reading by addressing an array of addressable image sensors; and c) capturing light through a section of the window from the indicia at a region-of-interest (ROI) having a plurality of regions spaced apart of one another within the field of view by addressing the addressable image sensors in each region, one region at a time, to detect the direction of the relative motion prior to the reading to insure that the indicia is located entirely within the field of view during the reading by the array.

12. The method of claim 11, and configuring each region as a rectangular region.

13. The method of claim 12, and arranging the rectangular regions at outer peripheral margins of the field of view to frame the field of view.

14. The method of claim 12, and arranging the rectangular regions to frame a central area of the field of view.

15. The method of claim 12, and arranging the rectangular regions to contact each other.

16. The method of claim 12, and arranging the rectangular regions to be remote from one another.

17. The method of claim 12, and spacing two of the rectangular regions apart along a first direction, and spacing another two of the rectangular regions apart along a second direction perpendicular to the first direction.

18. The method of claim 11, and illuminating the indicia during the reading with illumination at least ten times greater in intensity as compared to ambient light.

* * * * *